3,575,994
ACYL UREAS
Peter John Islip, Hampton, England, assignor to Parke, Davis & Company, Detroit, Mich.
No Drawing. Filed Mar. 6, 1968, Ser. No. 710,749
Claims priority, application Great Britain, Mar. 23, 1967, 13,878/67
Int. Cl. C07d 99/10
U.S. Cl. 260—306.8    6 Claims

ABSTRACT OF THE DISCLOSURE

N-acyl(nitrofurylthiazolyl)urea compounds

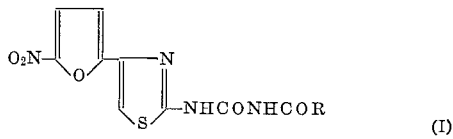
(I)

are prepared by reacting 2-amino-4-(5-nitro - 2 - furyl) thiazole with an acyl isocyanate R—CONCO, where R is lower alkyl or α- or β-haloalkyl. The compounds (I) are pharmacological agents having antiparasitic and antibacterial activity.

SUMMARY AND DETAILED DESCRIPTION

This invention relates to novel acyl urea compounds and process means for the production thereof. More particularly, the invention relates to N-acyl(nitrofurylthiazolyl)ureas having the formula:

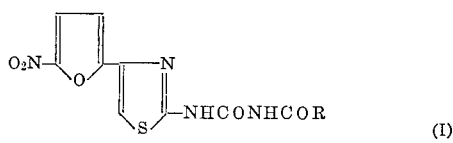
(I)

where R is a lower alkyl group, an α-halo substituted lower alkyl or a β-halo substituted lower alkyl group. The term lower alkyl as used in the present specification refers to alkyl groups having 1 to 3 carbon atoms and the term halo signifies chloro or bromo. The products of the invention in which the lower alkyl group designated by the term R contains 1 to 2 carbon atoms are preferred.

In carrying out the process of the invention an acyl isocyanate of formula R—CONCO is reacted with 2-amino-4-(5-nitro-2-furyl)thiazole; where R has the significance specified above. The reaction is ordinarily carried out in a non-reactant solvent. Suitable solvents include hydrocarbons (e.g., benzene or toluene), halogenated hydrocarbons (e.g., chloroform or methylene chloride), tertiary amides (e.g., dimethylformamide or N-methyl-2-pyrrolidone), ethers (e.g., diethyl ether, dioxane, dimethoxyethane or tetrahydrofuran); and mixtures of any such solvents. A preferred solvent is tetrahydrofuran. The conditions for carrying out the reaction are not critical. For example, equimolar quantities of reactants may be used but it is preferable to employ an excess of isocyanate reactant. Also, the reaction time and reaction temperature are subject to considerable variation. The preferred procedure is to carry out the reaction at temperatures in the range from 20 to 50° C. for periods from about 20 minutes to 3 hours. Temperatures outside of this range can be employed, for example, up to about 100° C. or more for periods from about 15 minutes to 24 hours. Outside of these ranges the results are less satisfactory. The desired product is isolated from the reaction mixture by collecting the same after it precipitates or crystallizes. While the product normally precipitates or crystallizes without special procedures, such separation from the reaction mixture can be induced by concentrating or evaporating the reaction mixture. The isocyanate starting materials for the reaction are known as a type. In some instances, however, certain of the isocyanates are specifically novel. In general, the acyl isocyanates are prepared by the reaction of the particular primary amide with oxalyl chloride in ethylene dichloride for about 16 hours at reflux temperature according to the method described in J. Org. Chem. 28:1805 (1963).

The compounds of the invention possess valuable pharmacological properties. In particular, by a standard test procedure (*Antibiotics and Chemotherapy*, 6, 337) the α-haloalkanoyl ureas of the invention especially show cidal activity against *E. histolytica* at low concentration of the order of 40 gamma per ml., being comparable to the known agent emetine. The α- and β-haloalkanoyl urea compounds of the invention, like the known agent furazolidone, are cidal at low concentration (i.e., about 25 gamma per ml. or lower) against *T. vaginalis* by standard assay (described in Trussell's *Trichomonas vaginalis and Trichomoniasis*, page 54 and elsewhere, Thomas, Springfield, Ill., 1947, and in *Antibiotics and Chemotherapy*, 9, 611). The compounds of the invention also have antibacterial properties. They are cidal when tested (*Biochemical Pharmacology*, 3, 10) against various organisms such as *S. aureus*, *E. coli*, *S. pyogenes* and *S. sonnei* at low concentration, that is, about 20 gamma per ml. and lower. Hence, the compounds can be used correspondingly as amebacidal agents, trichomoacidal agents, and antibacterial agents. For these purposes, the compounds in conventional formulation can be used topically or by the oral or parenteral routes. The compounds can also be used at cidal or suppressive concentration as a germicidal or disinfectant ingredient in conventional formulation for preventing or arresting the growth or action of microorganisms, for janitorial use, and for sanitizing articles of apparel, living quarters and the like. The α- and β-haloalkanoyl urea compounds of the invention can be used as intermediates for the preparation of the corresponding hydantoin and hydrouracil compounds which latter compounds have antiparasitic and antibacterial properties of the type just described. The preparation is carried out by reacting equimolar amounts of the acyl urea and sodium hydride (solvent, dimethylformamide) at 20–100° C. for ½ to 3 hours.

The invention is illustrated by the following examples.

EXAMPLE 1

A solution of 2-bromobutyryl isocyanate (5.8 g.) in tetrahydrofuran (10 ml.) is added dropwise to a stirred solution of 2-amino-4-(5-nitro-2-furyl)thiazole (51.4 g.) in tetrahydrofuran (100 mL). The mixture is stirred for 2 hours at 40° C. and the desired product which precipitates, 1-(2-bromobutyryl)-3-[4-(5-nitro-2-furyl)-2-thiazolyl]urea, is collected by filtration; M.P., after recrystallization from acetic acid, 227° C. (with decomposition).

EXAMPLE 2

A solution of 2-bromo-2-methylpropionyl isocyanate (5.8 g.) in tetrahydrofuran (10 ml.) is added dropwise to a stirred solution of 2-amino-4-(5-nitro-2-furyl)thiazole (5.14 g.) in tetrahydrofuran (100 ml.). The mixture is stirred for one hour at 20–25° C. and the desired product which separates, 1-(2-bromo-2-methylpropionyl)-3-[4-(5-nitro-2-furyl)-2-thiazolyl]urea, is collected; M.P. 249–251° C. (dec.) after recrystallization from acetic acid.

EXAMPLE 3

A solution of acetyl isocyanate (2.6 g.) in tetrahydrofuran (10 ml.) is added dropwise to a stirred solution of 2-amino-4-(5-nitro-2-furyl)thiazole (5.14 g.) in tetrahydrofuran (100 ml.). The reaction is stirred further for 1½ hours at 20–25° C. The desired product which separates, 1-acetyl-3-[4-(5-nitro-2-furyl)-2-thiazolyl]urea, is collected and recrystallized from acetic acid. The product softens and darkens at 274° C. and finally melts at 279° C. with decomposition.

EXAMPLE 4

A solution of propionyl isocyanate (2.8 g.) in tetrahydrofuran (10 ml.) is added dropwise to a solution of 2-amino-4-(5-nitro-2-furyl)thiazole (5.14 g.) in tetrahydrofuran (100 ml.). The reaction mixture is stirred for 2 hours at 40° C. The desired product, 1-[4-(5-nitro-2-furyl)-2-thiazolyl]-3-propionylurea, separates and after collection is recrystallized from dimethylformamide; M.P. >300° C.

EXAMPLE 5

A solution of chloroacetyl isocyanate (3.3 g.) in tetrahydrofuran (10 ml.) is added dropwise to a stirred solution of 2-amino-4-(5-nitro-2-furyl)thiazole (5.14 g.) in tetrahydrofuran (100 ml.). The resulting mixture is stirred for 2 hours at 40° C. The product which separates, 1-(chloroacetyl)-3-[4-(5-nitro-2-furyl)-2-thiazolyl]urea, is collected, recrystallized from dimethylformamide and washed with hot water; M.P. 227–229° C. (dec.).

EXAMPLE 6

A solution of 2-bromopropionyl isocyanate (5.2 g.) in tetrahydrofuran (10 ml.) is added dropwise to a stirred solution of 2-amino-4-(5-nitro-2-furyl)thiazole (5.14 g.) in tetrahydrofuran (100 ml.). The reaction mixture is stirred further for one hour at 20–25° C. The product, 1-(2-bromopropionyl)-3-[4-(5-nitro-2-furyl)-2-thiazolyl]urea, separates and is collected and recrystallized from dimethylformamide; M.P. 236–237° C. (dec.).

EXAMPLE 7

A solution of bromoacetyl isocyanate (5.1 g.) in tetrahydrofuran (10 ml.) is added dropwise to a stirred solution of 2-amino-4-(5-nitro-2-furyl)thiazole (5.14 g.) in tetrahydrofuran (100 ml.). The mixture is stirred for one-half hour at 20–25° C. and the product which separates is collected. This product, 1-(bromoacetyl)-3-[4-(5-nitro-2-furyl)-2-thiazolyl]urea, is purified by recrystallization from dimethylformamide and washed with hot water; M.P. 213° C. (dec.).

EXAMPLE 8

A solution of 3-bromopropionyl isocyanate (5.5 g.) in tetrahydrofuran (10 ml.) is added dropwise to a stirred solution of 2-amino-4-(5-nitro-2-furyl)thiazole (5.14 g.) in tetrahydrofuran (100 ml.). The reaction mixture is stirred for 1½ hours at 20–25° C. and the desired product, 1-(3-bromopropionyl)-3-[4-(5-nitro-2-furyl)-2-thiazolyl]urea, is collected and recrystallized from dimethylformamide; M.P. 228° C. (dec.).

I claim:
1. A compound of the formula:

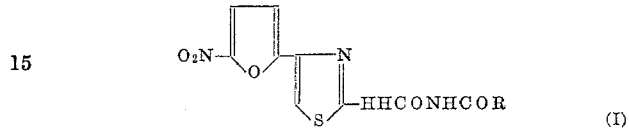

(I)

where R is a lower alkyl group, an α-halo lower alkyl group or a β-halo lower alkyl group.

2. A compound according to claim 1 where R is a bromomethyl group which compound is (bromoacetyl)-3-[4-(5-nitro-2-furyl)-2-thiazolyl]urea.

3. A compound according to claim 1 where R is a chloromethyl group which compound is 1-(chloroacetyl)-3-[4-(5-nitro-2-furyl)-2-thiazolyl]urea.

4. A compound according to claim 1 where R is a methyl group which compound is 1-acetyl-3-[4-(5-nitro-2-furyl)-2-thiazolyl]urea.

5. A compound according to claim 1 where R is an ethyl group which compound is 1-[4-(5-nitro-2-furyl)-2-thiazolyl]-3-propionylurea.

6. A compound according to claim 1 where R is a β-bromoethyl group which compound is 1-(3-bromopropionyl)-3-[4-(5-nitro-2-furyl)-2-thiazolyl]urea.

References Cited
UNITED STATES PATENTS

| | | | |
|---|---|---|---|
| 2,992,225 | 7/1961 | Dickson | 260—306.8 |
| 3,055,910 | 9/1962 | Dickson et al. | 260—306.8 |
| 3,261,865 | 7/1966 | Speziale et al. | 260—553 |

ALTON D. ROLLINS, Primary Examiner

U.S. Cl. X.R.

260—999